(12) United States Patent
Matsuda

(10) Patent No.: US 6,396,554 B1
(45) Date of Patent: May 28, 2002

(54) COLOR LIQUID CRYSTAL DISPLAY WITH REDUCED DATA LINE WIRING

(75) Inventor: Hiroshi Matsuda, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/493,881

(22) Filed: Jan. 28, 2000

(30) Foreign Application Priority Data

Jan. 29, 1999 (JP) .............................. 11-022182

(51) Int. Cl.⁷ ...................... G02F 1/1343; G02F 1/1345
(52) U.S. Cl. ...................... 349/139; 349/143; 349/148; 349/149
(58) Field of Search ................. 349/139, 148, 349/149, 143, 138

(56) References Cited

U.S. PATENT DOCUMENTS

| | | | | |
|---|---|---|---|---|
| 5,144,288 A | * | 9/1992 | Hamada et al. | 349/702 |
| 5,608,556 A | * | 3/1997 | Koma | 349/143 |
| 5,666,179 A | * | 9/1997 | Koma | 349/143 |
| 5,710,611 A | | 1/1998 | Suzuki et al. | 349/129 |
| 5,847,781 A | * | 12/1998 | Ono et al. | 349/44 |
| 5,926,238 A | * | 7/1999 | Inoue et al. | 349/61 |
| 5,995,175 A | * | 11/1999 | Kim et al. | 349/43 |
| 6,078,364 A | * | 6/2000 | Atherton | 349/38 |
| 6,078,371 A | * | 6/2000 | Ichikawa et al. | 349/95 |

FOREIGN PATENT DOCUMENTS

| | | |
|---|---|---|
| JP | 02 234127 | 9/1990 |
| JP | 7-311383 | * 11/1995 |
| JP | 09 043610 | 2/1997 |
| JP | 10-133233 | * 5/1998 |

* cited by examiner

Primary Examiner—William L. Sikes
Assistant Examiner—Mike Qi
(74) Attorney, Agent, or Firm—Hogan & Hartson, L.L.P.

(57) ABSTRACT

In a color liquid crystal display, a data line (1) for supplying data to pixels in accordance with an image to be displayed overlaps pixel electrodes adjacent to the pixel electrodes to which the data line is connected. Specifically, data line (1g) connected to green pixels overlaps pixels in a column direction in the alternating sequence of green and blue. Alternatively, the data line (1) may not overlap its connected pixels. The data line connected to green pixels may overlap pixels located adjacent to green pixels in a column direction in the alternating sequence of blue and red. With these arrangements, the meandering amplitude of data lines can be reduced to shorten the overall wiring length of the data lines.

48 Claims, 10 Drawing Sheets

COLOR LIQUID CRYSTAL DISPLAY WITH REDUCED DATA LINE WIRING

BACKGROUND OF THE INVENTION

1. Field of the Invention

The present invention relates to a color liquid crystal display (LCD), and more particularly to a color LCD in which pixel electrodes of the same color located close to one another in a column direction are driven by a single data line.

2. Description of the Prior Art

Conventionally, an LCD having orientation control windows opened in a common electrode opposing pixel electrodes has been proposed in, for example, JPA H06-301036. An LCD having orientation control windows is a vertical orientation type LCD using liquid crystal having negative anisotropy of dielectric constant. The orientation of the liquid crystal is controlled by the curving of electric field caused between end portions of a pixel electrode and of an orientation control window. Accordingly, it is unnecessary to perform rubbing processing on orientation films to provide a pre-tilt angle.

3. Description of the Related Art

Liquid crystal located directly underneath an orientation control window is not subjected to any electric field and remains without being driven. The technique of placing a data line in such a region is proposed in Japanese Patent Application No. H10-337840 filed by the present applicant. An LCD having a data line overlapping an orientation window is described below. It is to be noted that this technique does not constitute the prior art of the present application.

FIG. 1 is a plan view showing a conventional LCD having a data line overlapping an orientation control window, and FIG. 2 shows a cross-sectional view taken along line A—A of FIG. 1. A plurality of gate lines 51 made of metal such as chromium are formed extending along a row direction on a transparent insulator substrate 50 composed of materials such as glass or quartz. Over this layer, although not shown in FIG. 2, thin-film transistors (TFT) 53 are formed for each pixel, and an interlayer insulating film 52 is formed covering the TFT. Over the interlayer isolation film 52, a plurality of data lines are formed extending in columns. A source region of a TFT 53 is connected to a data line 54. A portion of a gate line 51 constitutes a gate electrode of a TFT. A pixel electrode 56 is formed over the TFT with a planarization film 55 disposed in between. A drain region of the TFT is connected to the pixel electrode via a contact hole. A vertical orientation control film 57 is formed further on top. Provided on a substrate arranged opposing the substrate 50 are color filters 61 each colored with a primary color for image display. The primary color may be one of the three colors of red (R), green (G), and blue (B), or alternatively, cyan, magenta, and yellow. The following explanation is made using the three colors of RGB. A protective film 62 is provided over the color filters 61, and a common electrode 63 used commonly for all pixels and an orientation control film 64 are formed over the protective film 62. Orientation control windows 65 where no electrode is present are formed in the common electrode 63 in regions opposing pixel electrodes 56. Liquid crystal 70 is filled between these substrates 50,60. The orientation of liquid crystal molecules is controlled in accordance with the strength of electric field generated by a voltage applied between pixel electrodes 56 and the common electrode 63. In this way, the polarizing characteristic of the liquid crystal 70 is changed, controlling the transmittance of the light linearly polarized by the polarizers 41,42.

The liquid crystal 70 has negative anisotropy of dielectric constant. That is, the liquid crystal has the property of orienting itself in a direction perpendicular to the direction of the electric field. The orientation control films 57,64 are vertical orientation control films which may be made of organic materials such as polyimide and polyamide or of inorganic silane materials. Liquid crystal molecules are controlled by the orientation control films such that their initial orientation when no voltage is applied is in the direction along the line normal to the substrates. When an electric field along the length of the Figure is generated by applying a voltage between a pixel electrode 56 and the common electrode 63, the liquid crystal located between these electrodes are tilted in a direction perpendicular to the electric field, i.e., along the width of the Figure. At the end portions of the pixel electrode 56 and of the orientation control window 65, the electric field becomes curved, and the direction in which the liquid crystal molecules are tilted is accordingly controlled towards the orientation control window 65. No electric field is generated in a region directly underneath the orientation control window 65 because no voltage is applied. Liquid crystal molecules are therefore not tilted and remain without being driven in this region.

As shown in FIG. 1, the data line 54 is formed overlapping an orientation control window in each pixel. One data line 54 is connected to and overlapped on pixels of the same color. Specifically, a data line 54g driving green pixels overlaps green pixels indicated by G, a data line 54r driving red pixels overlaps red pixels indicated by R, and a data line 54b driving blue pixels overlaps blue pixels indicated by B.

The pixel electrodes 56 are arranged in a matrix, but the pixel electrodes in one column are shifted by half a pixel away from one, another in a row direction. In addition, pixels of the same color are not located adjacent to one another. This arrangement is the so-called delta arrangement. As a data line 54 drives pixels of the same color and overlaps those pixels of the same color in positions shifted by 1.5 pixels from one another, the data line is arranged meandering by an amplitude of 1.5 pixels.

FIG. 3 is a plan view of a liquid crystal display having orientation control windows 66 in the shape of two letter Y's connected at their bottoms. Pixel electrodes indicated by rectangles are disposed in a delta arrangement. Each TFT 53 which includes a gate constituted by a portion of a gate line 51 extending along a row direction is formed for each pixel. The TFT is connected to the pixel electrode 56 via a contact hole. As the cross-section along A—A is identical to the cross-section of FIG. 2, the explanation will not be repeated.

The data line 54 is formed overlapping an orientation control window 65 in each pixel. One data line 54 is connected to and overlapped on pixels of the same color. Specifically, a data line 54g driving green pixels overlaps green pixels indicated by G, a data line 54r driving red pixels overlaps red pixels indicated by R, and a data line 54b driving blue pixels overlaps blue pixels indicated by B.

However, when a data line 54 is formed to overlap pixels that are shifted by 1.5 pixels as described above, the wiring of the data line 54 becomes long, possibly causing the following problems.

With the enlargement of an area in which the data line 54 and the common electrode 63 face one another, parasitic capacitance generated between the data line and the electrode becomes larger. Consequently, time required for applying a voltage to the data line 54 (referred to as the time constant) is increased. When the time constant is larger, it may not be possible to raise the voltage on the data line 54 within a predetermined time period. Accordingly, sufficient voltage may not be applied to the pixel electrodes 56, resulting in degradation of display quality.

As data lines 54 are made of metal such as chromium, a region in which a data line 54 is formed does not let light pass through. When this region is enlarged, the aperture ratio is reduced, causing a decrease in display contrast and therefore degradation of display quality.

By having data lines 54 meandering by an amplitude of 1.5 pixels, regions are created where two data lines 54 overlap. Margins must therefore be reserved to accommodate widths of the data lines and to maintain spaces between the data lines. This requires an increased amount of inter-pixel space and decreases aperture ratio.

SUMMARY OF THE INVENTION

In light of the above, the object of the present invention is to provide a LCD with high display quality in which the meandering amplitude of a data line is reduced, shortening the overall length of data lines.

According to the present invention conceived for accomplishing the above object, there is provided a color liquid crystal display comprising a plurality of pixel electrodes arranged in a matrix such that, in adjacent rows, positions of pixels associated with the same color are shifted from one another; and a data line extending in a column direction while overlapping predetermined pixel electrodes among said plurality of pixel electrodes, the data line electrically connecting to pixel electrodes associated with the same color and located closely along the column direction, while at least a portion of said data line overlaps pixel electrodes associated with a color different from the connected pixel electrodes.

In another aspect of the present invention, the arrangement of the pixel electrodes is a delta arrangement.

In a different aspect of the present invention, a row in which the data line overlaps a connected pixel electrode and an adjacent row in which the data line overlaps a pixel electrode of a different color are arranged alternately.

According to another aspect of the present invention, pixel electrodes on which the data line overlaps are only pixel electrodes of a different color located adjacent to the connected pixel electrodes.

According to a further aspect of the present invention, the color liquid crystal display comprises a common electrode provided opposing said plurality of pixel electrodes; liquid crystal sealed between said common electrode and said plurality of pixel electrodes; and an orientation controller for controlling an orientation of the liquid crystal. The liquid crystal has a negative anisotropy of dielectric constant.

As described above, at least a portion of the data line overlaps pixel electrodes of a different color according to the present invention. As a result, the length of the data line is shortened, and the meandering amplitude is made smaller. The time constant of the data line can therefore be reduced, achieving high display quality.

In the present invention, inter-pixel regions can be made smaller or pixels can be enlarged because the total area of data lines is reduced, and inter-pixel regions in which two data lines overlap no longer exist. Accordingly, the aperture ratio can be increased, accomplishing higher brightness and display quality.

In another aspect of the present invention, the orientation controller comprises orientation control windows including electrode openings made in the common electrode at positions corresponding to the plurality of pixel electrodes.

According to a different aspect of the present invention, the orientation controller comprises orientation control slopes disposed on one or both of an interface between the common electrode and the liquid crystal, and interfaces between the plurality of electrodes facing the liquid crystal, the orientation control slopes formed by causing the facing interfaces to protrude towards the liquid crystal.

According to a further aspect of the present invention, the orientation controller is provided within pixel regions corresponding to each of the plurality of pixel electrodes, and functions as an orientation divider for providing a plurality of discrete orientations of liquid crystal within each pixel region. According to this aspect, the data line overlaps the orientation controllers within predetermined pixel regions.

As described above, a predetermined data line overlaps an orientation controller. When liquid crystal with negative anisotropy of dielectric constant is employed in a vertical orientation type LCD, the orientation of the liquid crystal constantly remains unchanged from the vertical direction within regions directly above an orientation control window or an orientation control slope explained later. Such regions therefore do not contribute when displaying images. Accordingly, no decrease in aperture ratio of the overall display is caused by overlapping data lines on these regions. As no electric fields are applied to liquid crystal located directly above such orientation controller, light leakage may possibly occur when the orientation of liquid crystal in these regions is altered by other factors. However, in the present invention, while the length of data line wiring is minimized, the data lines may be formed of light-shielding materials and arranged to overlap these orientation control means, thereby also facilitating prevention of light leakage.

In a further different aspect of the present invention, a transistor is connected to each of the plurality of pixel electrodes, and the data line is connected via the transistors to the pixel electrodes, among the plurality of pixel electrodes, that are associated with the same color and located closely along the column direction.

The data line is arranged to overlap either a connected pixel electrode or a pixel electrode of a different color located adjacent thereto. Accordingly, even when the data line overlaps pixel electrodes of a color different from the associated color, the wiring between the transistor for a connected pixel electrode and the data line does not need to be made much longer and is kept to a minimal length. Operational deficiencies due to long wiring to transistors can therefore be avoided, and transistors can be reliably operated at a high speed to supply data to be displayed in each pixel from the data line to pixel electrodes via the transistors.

DESCRIPTION OF THE PREFERRED EMBODIMENTS

Figure 4:
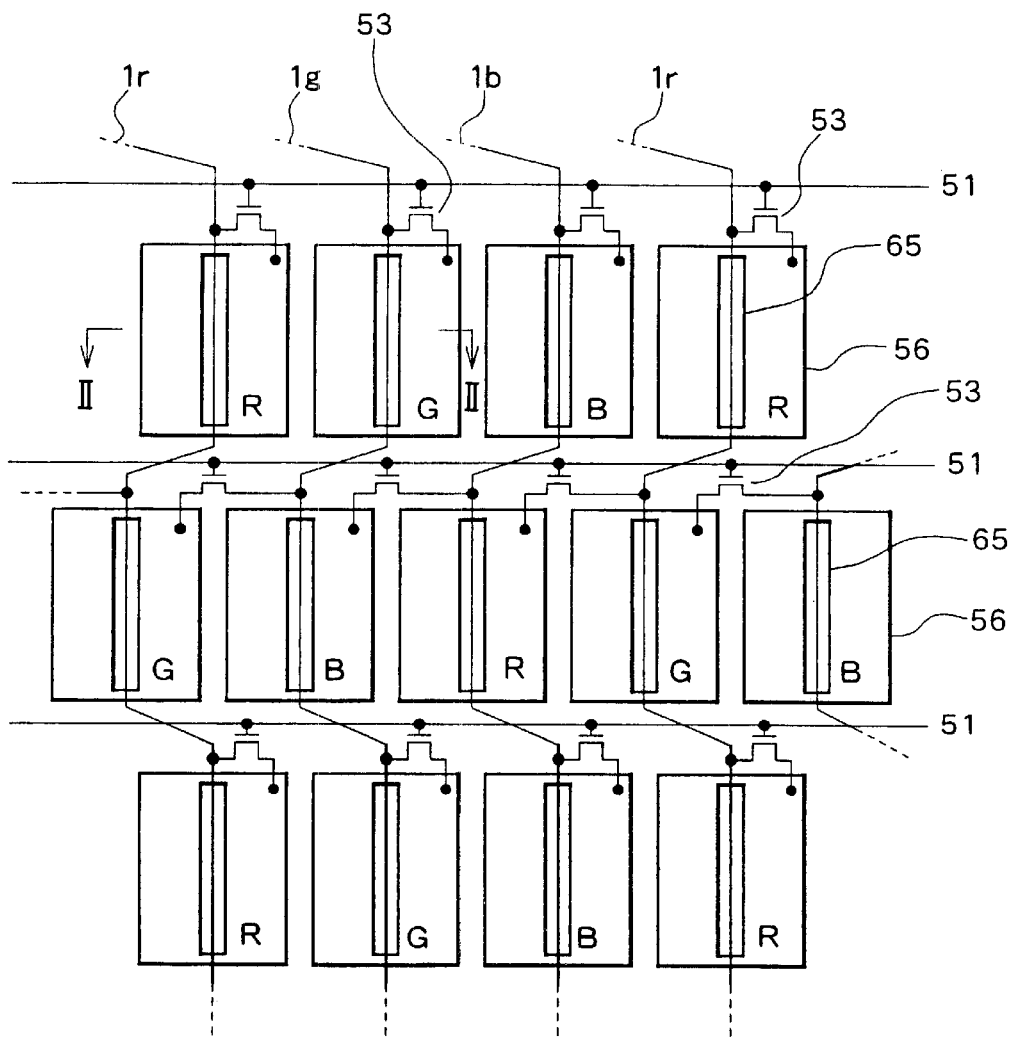
FIG. 4 is a schematic plan view of a color liquid crystal display according to a first embodiment of the present invention.

FIG. 4 is a plan view showing a first embodiment of the present invention. Pixel electrodes 56 indicated by rectangles are disposed in a delta arrangement. Orientation control windows 65 are formed in the common electrode. TFTs 53 are formed for each pixel, and each TFT uses a portion of a gate line 51 extending along a row direction as a gate. Each TFT 53 is connected to a pixel electrode 56 via a contact hole. As the cross-sectional view along II—II is identical to the cross-sectional view of FIG. 2, its explanation will not be repeated here.

Data lines 1 extend in column directions and connect to source regions of the TFT 53. Data line 1g is for driving green pixels (indicated by G), and each TFT formed for green pixels is connected to data line 1g. In the top row in the Figure, data line 1g overlaps the orientation control window 65 of a green pixel. However, in the center row under the top row, data line 1g overlaps the orientation control window of a blue (B) pixel adjacent to a green pixel, and TFT 53 is extended to and connected with the green pixel. In the bottom row in the Figure, data line 1g again overlaps a green pixel.

Similarly, data line 1b is for driving blue pixels, and data line 1r is for driving red pixels. In the top row, these data lines overlap the pixels to which they are connected. In the next row, the data lines overlap pixels located adjacent to connected pixels, and the overlapped pixels are pixels to which the data lines are not connected.

Figure 1:
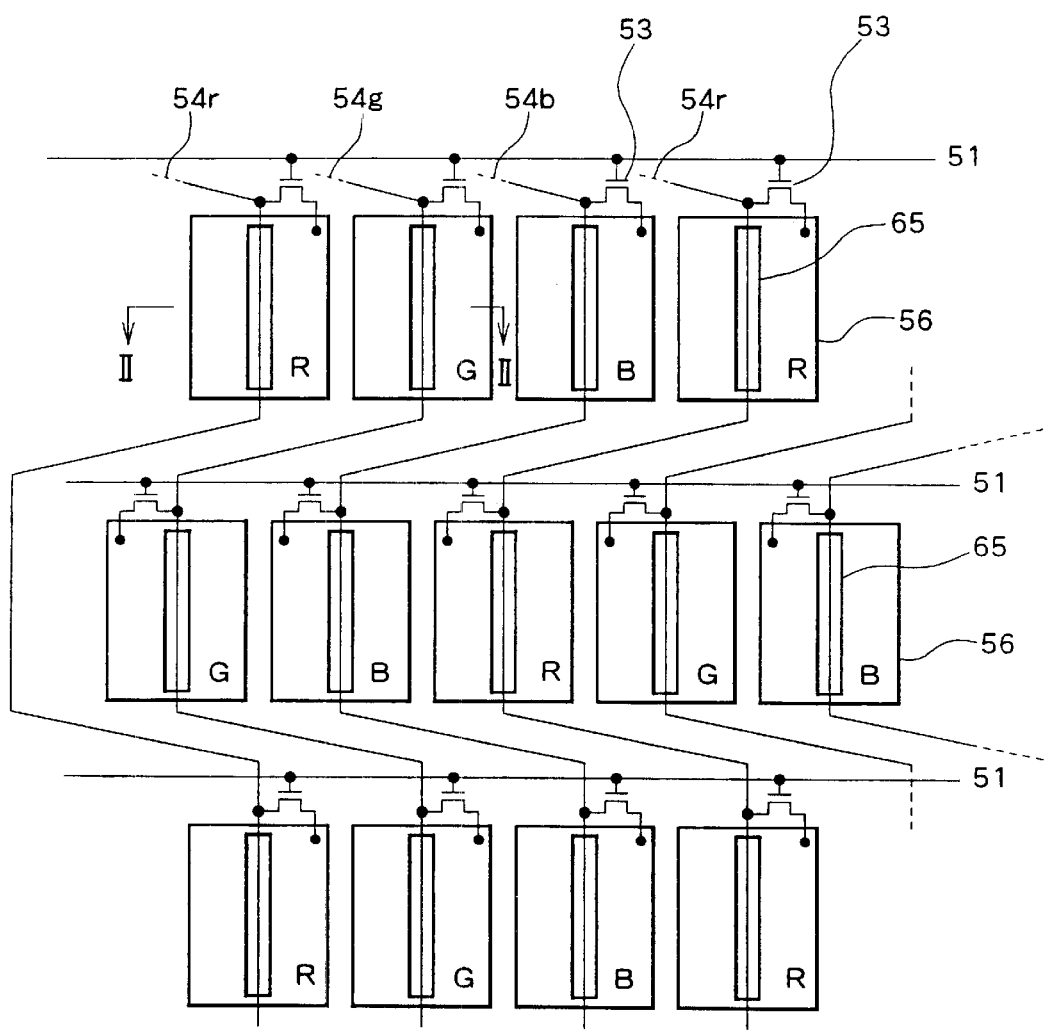
FIG. 1 is a schematic plan view of a color liquid crystal display according to a related art of the present invention.

According to the above arrangement, data lines 1 of the present embodiment are formed on pixels that are shifted from one another by only 0.5 pixels along the row direction. The wiring length of data lines 1 is shorter compared to data lines 54 in FIG. 1. Moreover, the wiring length of TFT 53 does not differ by a large amount from that of FIG. 1 because, in each row, a data line 1 overlaps either a pixel which the data line drives or a pixel located adjacent thereto.

Figure 5:
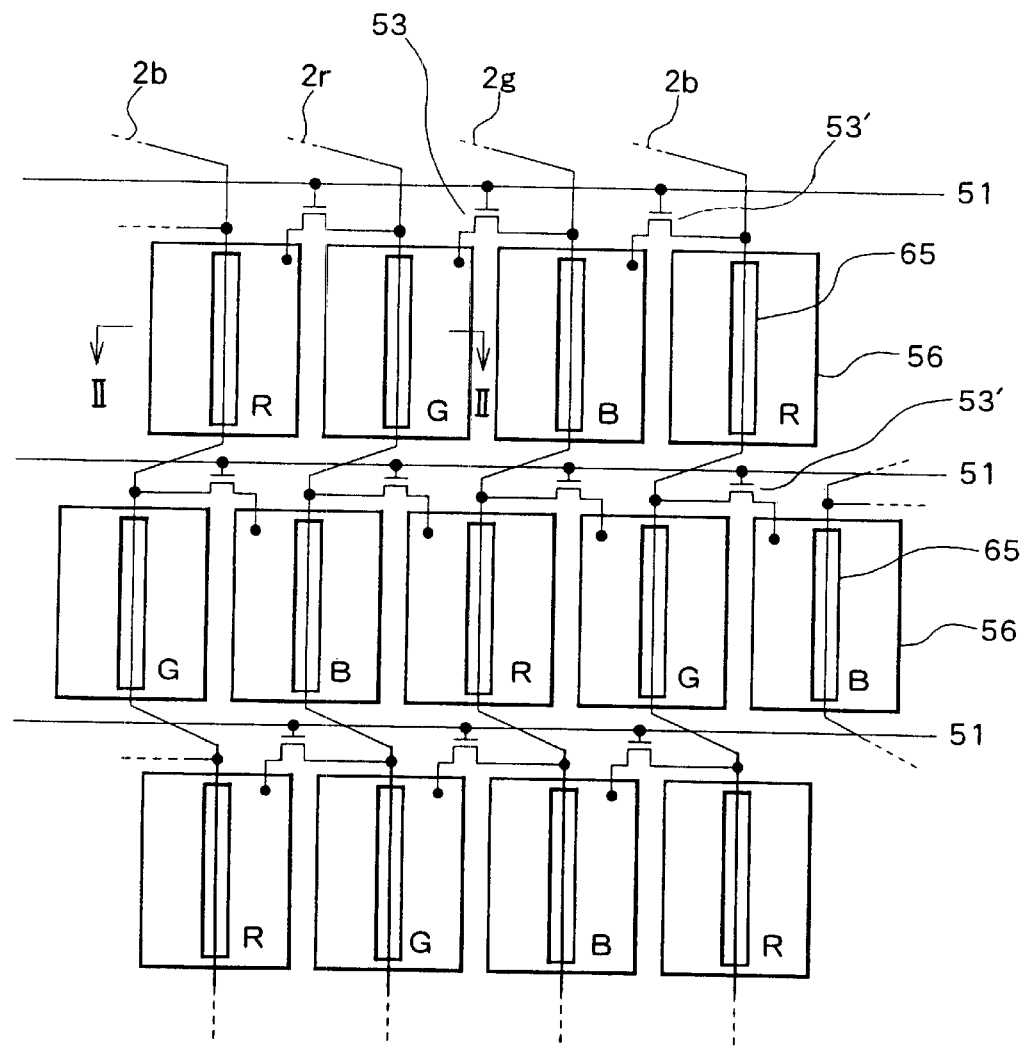
FIG. 5 is a schematic plan view of a color liquid crystal display according to a second embodiment of the present invention.

FIG. 5 is a plan view showing a second embodiment of the present invention. Pixel electrodes 56 indicated by rectangles are disposed in a delta arrangement. Orientation control windows 65 are formed in the common electrode. TFTs 53 are formed for each pixel, and each TFT uses a portion of a gate line 51 extending along a row direction as a gate. Each TFT 53 is connected to a pixel electrode 56 via a contact hole. As the cross-sectional view along II—II is identical to the cross-sectional view of FIG. 2, its explanation will not be repeated here.

Data lines 2 extend in column directions and are connected to source regions of the TFTs 53. Data line 2g is for driving green pixels (indicated by G), and each TFT formed for green pixels is connected to data line 2g. In the top row in the Figure, data line 2g overlaps the orientation control window 65 of a blue pixel, while, in the center row, data line 2g overlaps the orientation control window of a red pixel. In the bottom row of the Figure, data line 2g again overlaps a blue pixel. In summary, data line 2g does not overlap any green pixels, and all the pixels which data line 2g overlaps are located adjacent to a green pixel.

Similarly, data line 2b is for driving blue pixels, and data line 2r is for driving red pixels. These data lines overlap pixels located adjacent to connected pixels, and the overlapped pixels are pixels to which the data lines are not connected.

Similarly in this second embodiment, data lines 2 are formed on pixels that are shifted from one another by only 0.5 pixels along the row direction. The wiring length of data lines 2 is shorter compared to data lines 54 in FIG. 1. Moreover, the wiring length of the TFTs 53 does not differ by a large amount from that of FIG. 1 because, in each row, a data line 2 overlaps a pixel located adjacent to a pixel which the data line drives.

Figure 6:
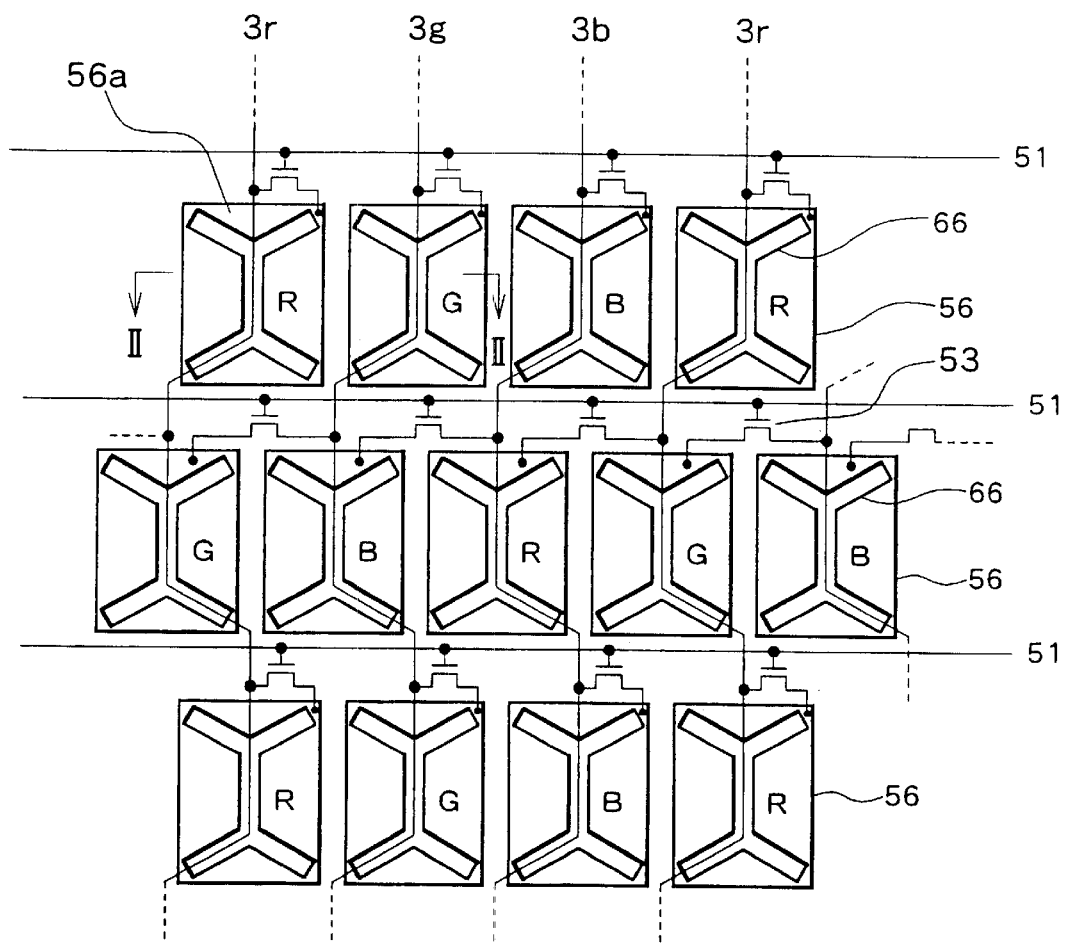
FIG. 6 is a schematic plan view of a color liquid crystal display according to a third embodiment of the present invention.

FIG. 6 is a plan view showing a third embodiment wherein the present invention is implemented in a liquid crystal display having orientation control windows 66 in the shape of two letter Y's connected at their bottoms. Pixel electrodes 56 indicated by rectangles are disposed in a delta arrangement. TFTs 53 are formed for each pixel, and each TFT uses a portion of a gate line 51 extending along a row direction as a gate. Each TFT 53 is connected to a pixel electrode 56 via a contact hole. As the cross-sectional view along II—II is identical to the cross-sectional view of FIG. 2, its explanation will not be repeated here.

Data lines 3 extend in column directions and are connected to source regions of the TFT 53. Data line 3g is for driving green pixels (indicated by G), and each TFT formed for green pixels is connected to data line 3g. In the top row in the Figure, data line 3g overlaps the orientation control window 66 of a green pixel. However, in the center row under the top row, data line 3g overlaps the orientation control window of a blue (B) pixel adjacent to a green pixel. In the bottom row in the Figure, data line 3g again overlaps a green pixel.

Similarly, data line 3b is for driving blue pixels, and data line 3r is for driving red pixels. In the top row, these data lines overlap the pixels to which they are connected. In the next row, the data lines overlap pixels located adjacent to connected pixels, and the overlapped pixels are pixels to which they are not connected.

An orientation control window 66 in the shape of two connected letter Y's can be otherwise described as a slit created in a position corresponding to the center of the associated pixel electrode 56 and extended along the sides of the pixel poles, this slit branching at its two ends towards each of the corners of the pixel electrode 56. A data line 3 may be formed along the shape of an orientation control window 66 by entering a pixel from its corner and exiting from another corner, similarly to the data line shown in FIG. 3. However, it is preferable that a data line 3 be formed to enter from a side of a pixel and exit from a corner as illustrated in FIG. 6 because data line length can be reduced by such an arrangement. Pixel regions 56a at the top and bottom of a pixel outside the window portions branched into two are in the shape of narrow strips, and even if a data line crosses these regions, the aperture ratio is not significantly affected.

As data lines 3 are formed on pixels that are shifted from one another only by 0.5 pixels along the row direction, the wiring length of data lines 3 is shorter compared to conventional data lines 54. Moreover, the wiring length of the TFTs 53 does not differ by a large amount from that of FIG. 3 because, in each row, a data line 3 overlaps either a pixel which the data line drives or a pixel located adjacent thereto.

Figure 7:
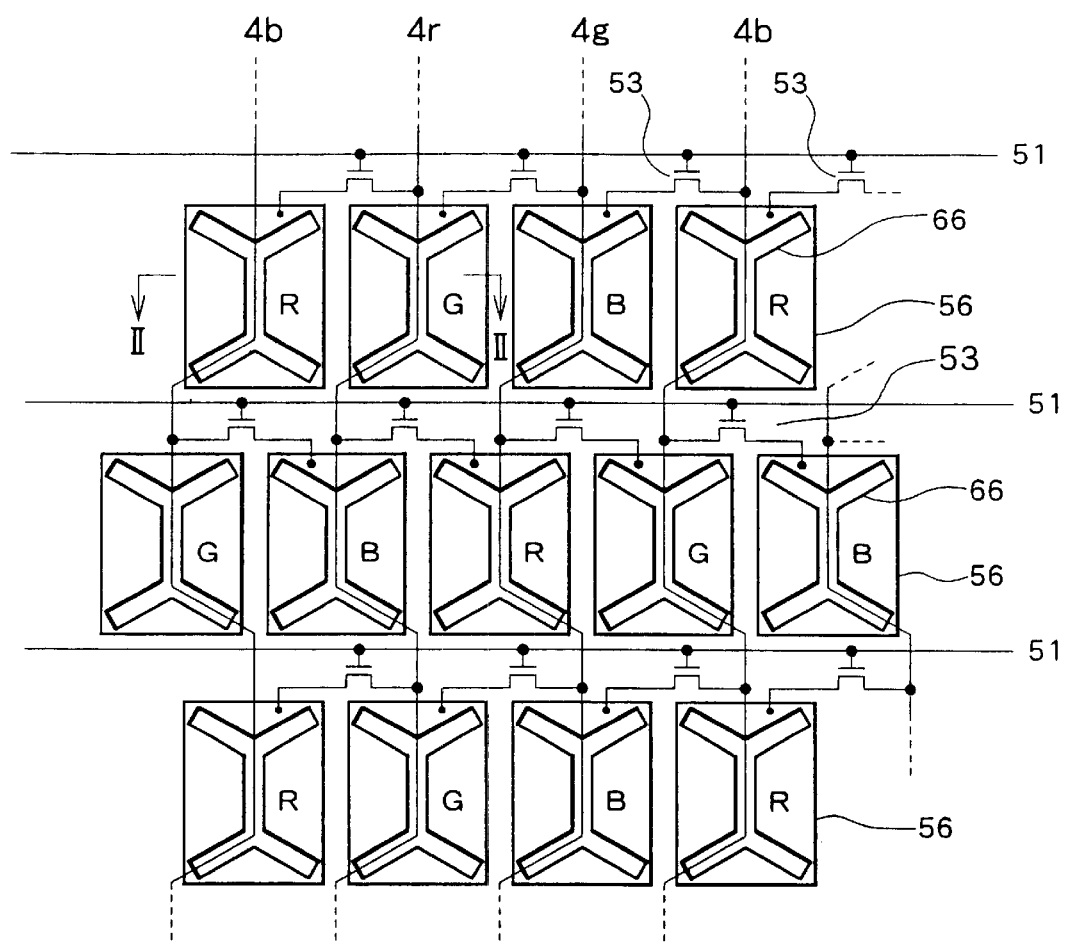
FIG. 7 is a schematic plan view of a color liquid crystal display according to a fourth embodiment of the present invention.

FIG. 7 is a plan view showing a fourth embodiment wherein the present invention is implemented in a liquid crystal display having orientation control windows 66 in the shape of two letter Y's connected at their bottoms. Pixel electrodes 56 indicated by rectangles are disposed in a delta arrangement. TFTs 53 are formed for each pixel, and each TFT uses as a gate a portion of a gate line 51 extending along a row direction. Each TFT 53 is connected to a pixel electrode 56 via a contact hole. As the cross-sectional view along II—II is identical to the cross-sectional view of FIG. 2, its explanation will not be repeated here.

Data lines 4 extend in column directions and are connected to source regions of the TFTs 53. Data line 4g is for driving green pixels (indicated by G), and each TFT formed for green pixels is connected to data line 4g. In the top row in the Figure, data line 4g overlaps the orientation control window 66 of a blue pixel, while, in the center row, data line 4g overlaps the orientation control window of a red pixel. In the bottom row of the Figure, data line 4g again overlaps a blue pixel. In summary, data line 4g does not overlap any green pixels, and all the pixels which data line 4g overlaps are located adjacent to a green pixel.

Similarly, data line 4b is for driving blue pixels, and data line 4r is for driving red pixels. These data lines overlap pixels located adjacent to connected pixels, and the overlapped pixels are pixels to which they are not connected.

Figure 3:
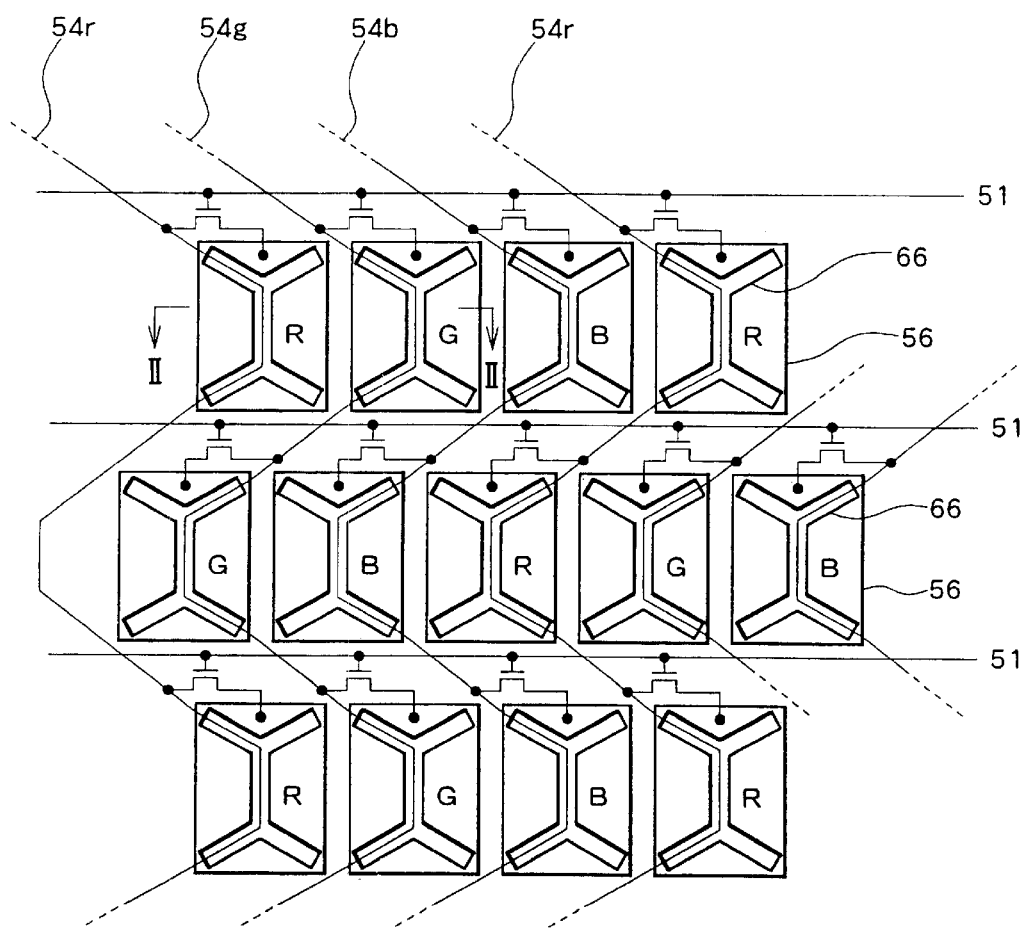
FIG. 3 is a schematic plan view of another color liquid crystal display according to a related art of the present invention.

A data line 4 may be formed following the shape of an orientation control window 66 by entering a pixel from its corner and exiting from another corner, similarly to the data line shown in FIG. 3. However, it is preferable that a data line 4 be formed to enter from a side of a pixel and exit from a corner as illustrated in FIG. 7.

Similarly in this fourth embodiment, data lines 4 are formed on pixels that are shifted from one another by only 0.5 pixels along the row direction. The wiring length of data lines 4 is therefore shorter compared to conventional data lines 54. Moreover, the wiring length of TFT 53 does not differ by a large amount from that of FIG. 3 because, in each row, a data line 4 overlaps a pixel located adjacent to a pixel which the data line drives.

Figure 8:
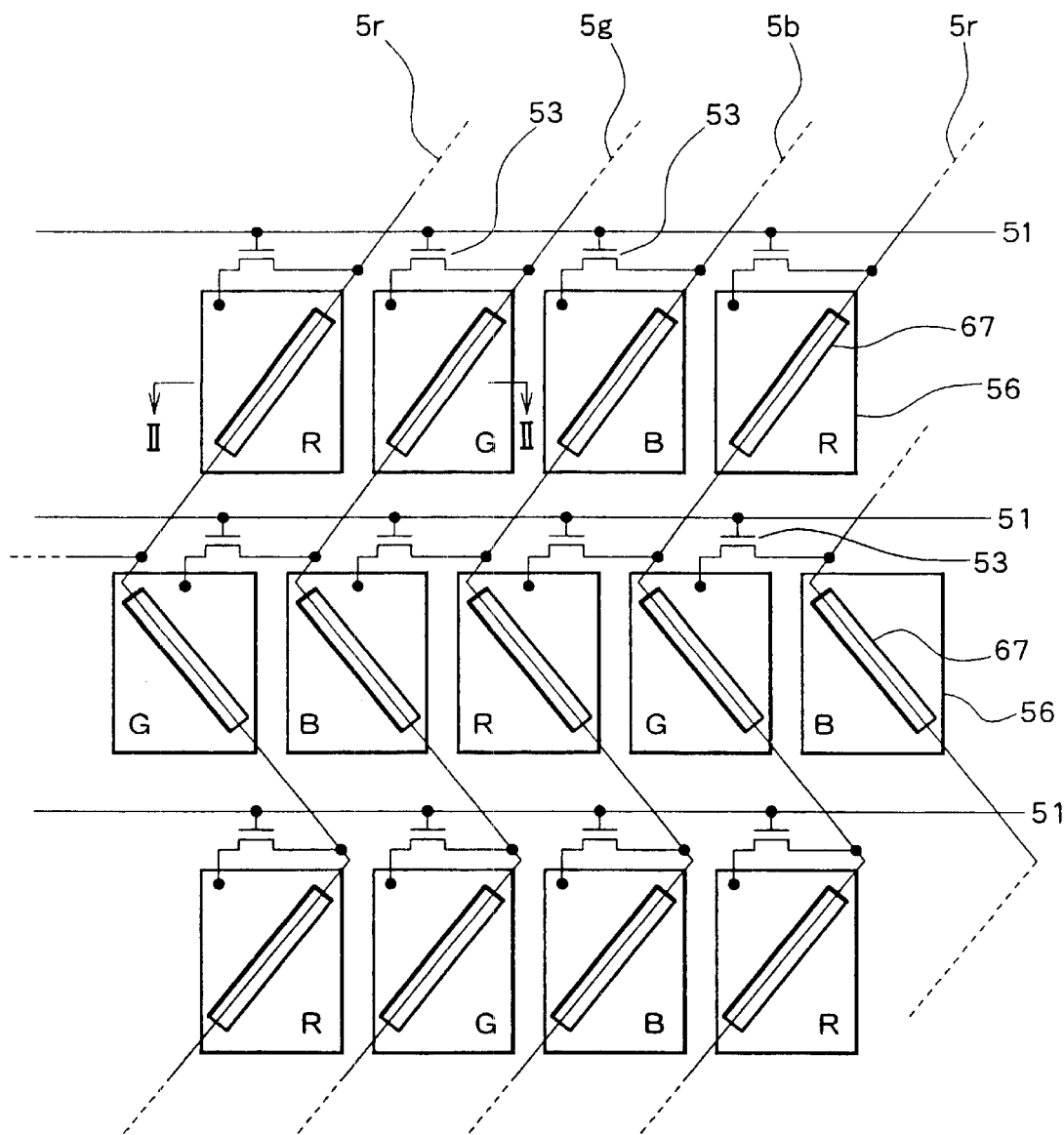
FIG. 8 is a schematic plan view of a color liquid crystal display according to a fifth embodiment of the present invention.

FIG. 8 is a plan view showing a fifth embodiment wherein the present invention is implemented in a liquid crystal display having orientation control windows 67 formed from corners of pixels along their diagonals. Pixel electrodes 56 indicated by rectangles are disposed in a delta arrangement. TFTs 53 are formed for each pixel, and each TFT uses a portion of a gate line 51 extending along a row direction as a gate. Each TFT 53 is connected to a pixel electrode 56 via a contact hole. As the cross-sectional view along II—II is identical to the cross-sectional view of FIG. 2, its explanation will not be repeated here.

Data lines 5 extend along column directions and are connected to source regions of the associated TFT 53. Data line 5g is for driving green pixels (indicated by G), and each TFT formed for green pixels is connected to data line 5g. In the top row in the Figure, data line 5g overlaps the orientation control window 66 of a green pixel. However, in the center row under the top row, data line 5g overlaps the orientation control window of a blue (B) pixel adjacent to a green pixel. In the bottom row in the Figure, data line 5g again overlaps a green pixel.

Similarly, data line 5b is for driving blue pixels, and data line 5r is for driving red pixels. In the top row, these data lines overlap the pixels to which they are connected. In the next row, the data lines overlap pixels located adjacent to connected pixels, and the overlapped pixels are pixels to which they are not connected.

When orientation control windows are shaped as in the present embodiment, the meandering amplitude of a data line would be 2.5 pixels if the data line is arranged only on pixels of the same color. In this embodiment, however, data lines 5 are formed on pixels that are shifted from one another by only 0.5 pixels along the row direction. The wiring length of data lines 5 is shorter compared to data lines overlapped only on pixels of the same color. Moreover, the wiring length of the TFTs 53 does not differ by a large amount from a case where a data line is arranged only on same color pixels because, in each row, a data line 5 overlaps either a pixel which the data line drives or a pixel located adjacent thereto.

By practicing any of the above-described embodiments in an LCD in which data lines are formed overlapping the pixel electrodes, the data line length can be reduced compared to conventional structures because at least a portion of a data line is formed overlapping predetermined pixels adjacent to the pixels that the data line drives. Various shapes other than those described above can be used as the shape of orientation control windows, and the present invention may be implemented using any of those shapes. Although the above embodiments were explained using an LCD wherein the data lines overlap the orientation control windows, the present invention is not limited to this structure. The present invention can similarly be implemented in any LCD in which data lines are formed within pixel regions for any reasons, such as in a case where data lines are formed overlapping disclination lines constantly present within the pixels.

The above-described orientation control means controls the orientation of liquid crystal molecules within each pixel region of a vertical orientation type LCD using liquid crystal having negative anisotropy of dielectric constant. The orientation control means also functions as an orientation divider for dividing each pixel region into a plurality of discrete regions containing liquid crystal of different orientations. The bordering portions between different orientations within one pixel region correspond to the regions covered by the orientation control means, fixing the orientation borderline (disclination) positions within one pixel region. In the above embodiments, as a plurality of orientations of liquid crystal are provided within one pixel region, the viewing angle of the overall liquid crystal display can be improved notably.

In the above embodiments, data lines overlap orientation control means within predetermined pixel regions. In regions directly above an orientation control window or an orientation control slope explained below, the orientation of liquid crystal constantly remains unchanged from the vertical direction and does not contribute when displaying images. Accordingly, no decrease in aperture ratio results when data lines are overlapped in these regions. Furthermore, as no electric fields are applied to liquid crystal located directly above such orientation control means, light leakage may possibly occur when the orientation of liquid crystal in these regions is altered by other factors. However, the present invention reliably prevents light leakage by overlapping data lines made of light-shielding materials on these orientation control means.

Figure 2:
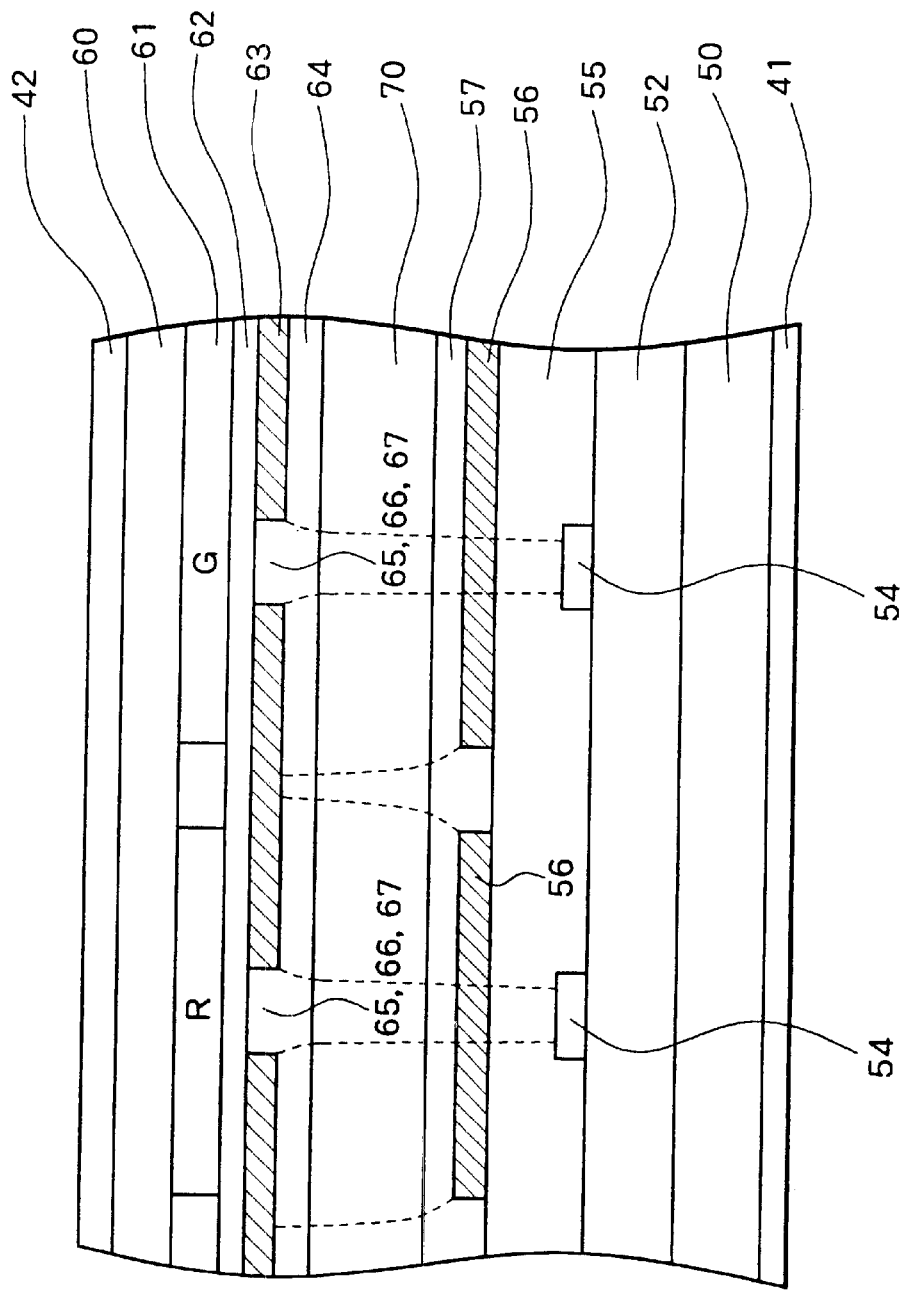
FIG. 2 is a cross-sectional view taken along line II—II of FIG. 1.
Figure 9:
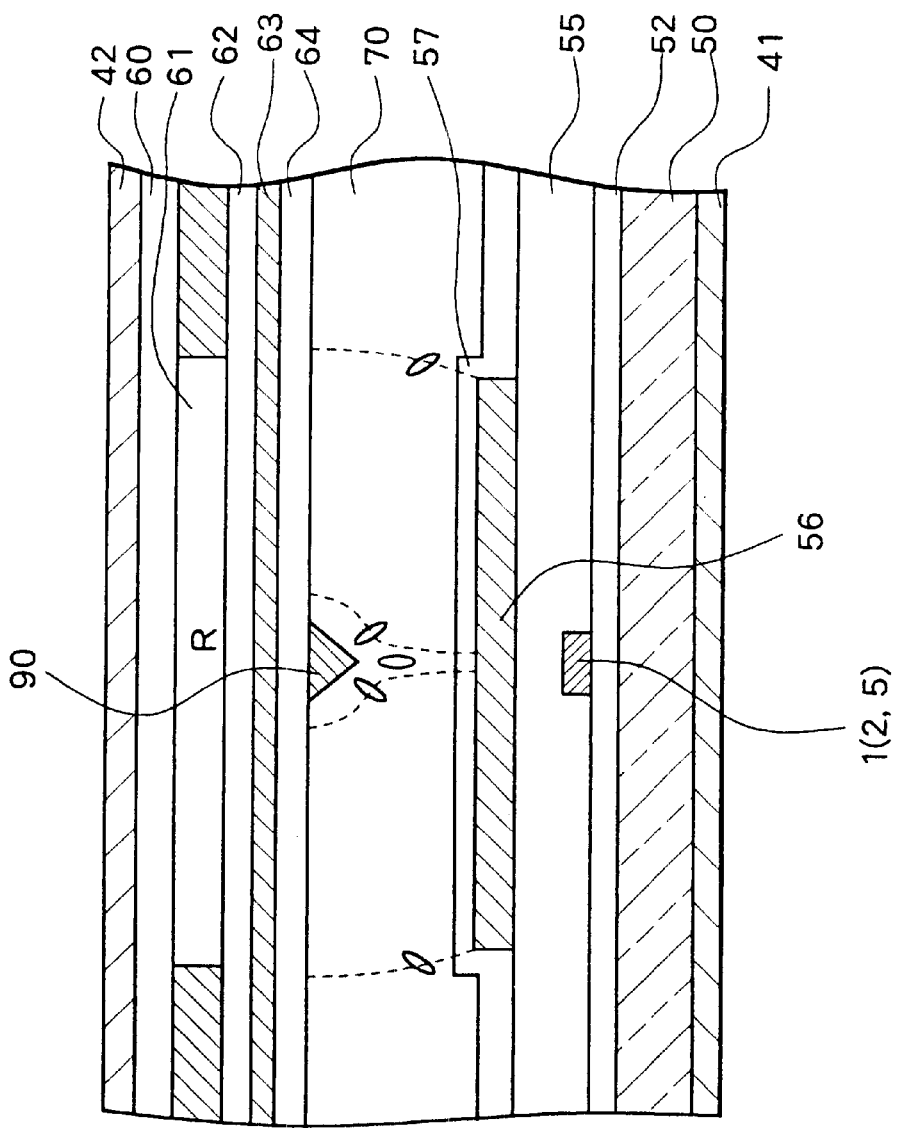
FIG. 9 is a cross-sectional view illustrating a different structure of orientation controller for the color liquid crystal display according to the present invention.
Figure 10:
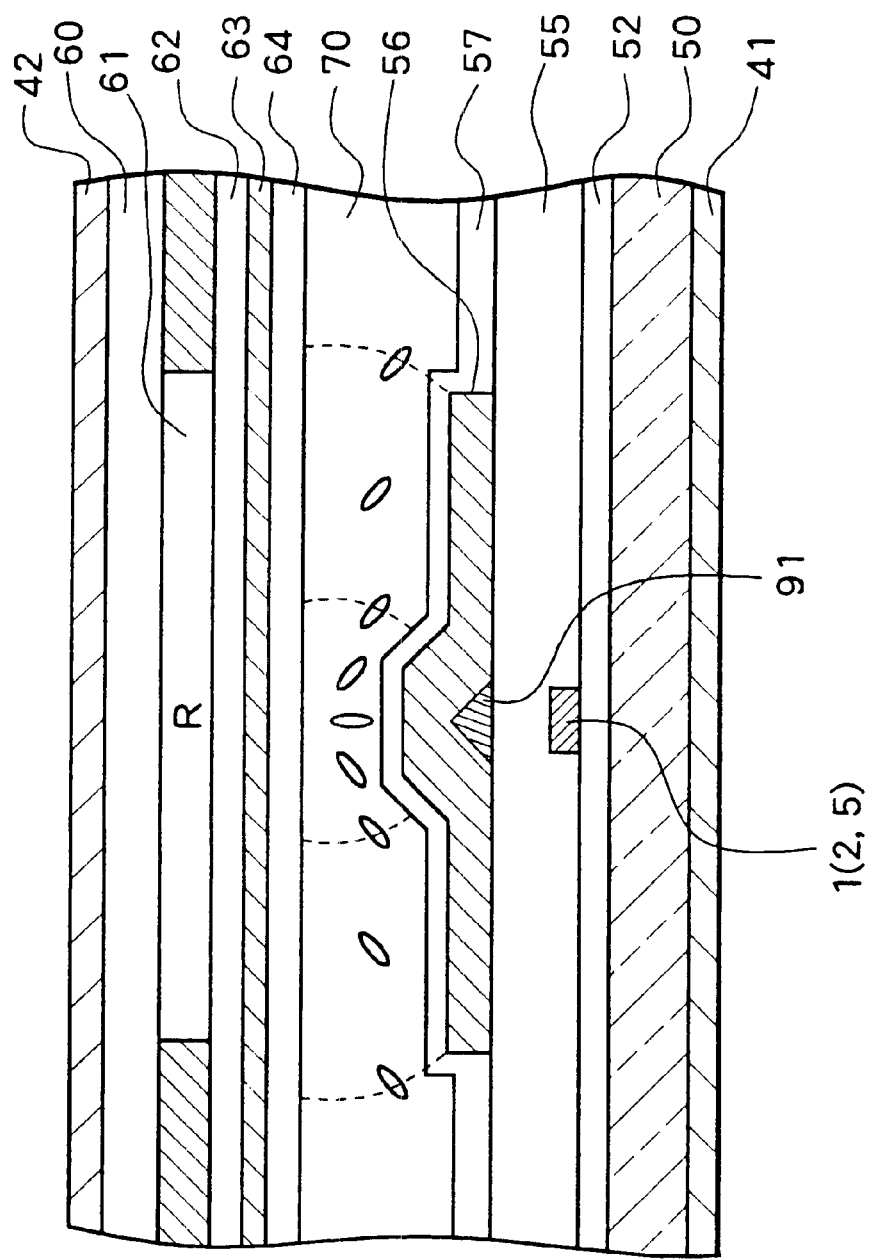
FIG. 10 is a cross-sectional view illustrating a different structure of orientation controller for the color liquid crystal display according to the present invention.

Although the above embodiments employ orientation control windows formed in the common electrode as the orientation control means, the present invention is not restricted to this structure. Instead of providing an orientation control window, protruding portions 90,91 may be formed between the liquid crystal and the common electrode, or on the pixel electrodes on their liquid crystal sides, as shown in FIG. 9 or 10. The slopes facing the liquid crystal created by these protruding portions 90,91 may be used as the orientation control means (orientation control slope). Concerning the orientation control slope, refer, for example, to Japanese Patent Application No. H10-337840 filed by the present applicant. FIGS. 9 and 10 correspond to the schematic cross-sectional view along II—II of FIGS. 4–8, and the structures that correspond to those shown in FIG. 2 are indicated by corresponding reference numerals. In the example shown in FIG. 9, protruding portions 90 made of an insulating material are formed in patterns similar to the orientation control windows 65,66 of FIGS. 4 and 6 between the liquid crystal and the common electrode 63 (i.e. on a surface of the orientation film 64 facing the liquid crystal layer 70, since the orientation film 64 covers the common electrode 63). According to FIG. 10, protruding portions 91 made of an insulating material are created in patterns similar to the orientation control windows of FIGS. 4 and 6 underneath a plurality of pixel electrodes 56 formed in a matrix pattern on a first substrate 50. In the example of FIG. 10, the shape of the protruding portion 91 is reflected in the pixel electrode 56 and the orientation film 57. The surface of the orientation film 57 therefore protrudes towards the liquid crystal.

By providing such protruding portions 90,91, the electric field applied to the liquid crystal 70 becomes curved as indicated by dotted lines in FIGS. 9 and 10. Orientation of liquid crystal 70 is therefore separately controlled on both sides of the protruding portions 90,91, with the protruding portions 90,91 functioning as the orientation control slopes. The present invention can reduce data line wiring and achieve a high quality liquid crystal display device similarly to the above embodiments while arranging data lines 1 (2,5) to spatially overlap with these protruding portions 90,91.

The above embodiments were described using, as an example, the so-called delta arrangement in which pixels of the same color in the column direction are shifted from one another by 1.5 pixels along a row direction. However, the shift amount is not limited to 1.5 pixels. Except when using a stripe arrangement wherein pixels of the same color are aligned along a straight line in the column direction, the present invention is similarly effective when, for example, the pixels are arranged shifted by 1.2 pixels.

What is claimed is:

1. A color liquid crystal display comprising:
   a plurality of pixel electrodes arranged in a matrix such that, in adjacent rows, positions of pixels associated with the same color are shifted from one another in a row direction; and
   a data line extending in a column direction while overlapping predetermined pixel electrodes among said plurality of pixel electrodes, said data line electrically connecting only to pixel electrodes associated with the same color and located closely along the column direction, at least one of said plurality of pixel electrodes overlapping said data line being electrically unconnected to said data line and being associated with a color different from the connected pixel electrodes.

2. The color liquid crystal display defined in claim 1 wherein
   a row in which said data line overlaps a connected pixel electrode and a row in which said data line overlaps a pixel electrode associated with a color different from a connected pixel electrode are alternately arranged.

3. The color liquid crystal display defined in claim 1 wherein
   the predetermined pixel electrodes among said plurality of pixel electrodes comprise pixel electrodes that are located adjacent to the connected pixel electrodes and associated with a different color.

4. The color liquid crystal display defined in claim 1 wherein
   the predetermined pixel electrodes among said plurality of pixel electrodes only comprise pixel electrodes that are arranged adjacent to the connected pixel electrodes and associated with a different color.

5. The color liquid crystal display defined in claim 1 further comprising:
   a common electrode arranged opposing said plurality of pixel electrodes;
   liquid crystal having a negative anisotropy of dielectric constant sealed between said common electrode and said plurality of pixel electrodes; and
   orientation controllers for controlling orientation of said liquid crystal.

6. The color liquid crystal display defined in claim 5 wherein
   a row in which said data line overlaps a connected pixel electrode and a row in which said data line overlaps a pixel electrode associated with a color different from a connected pixel electrode are alternately arranged.

7. The color liquid crystal display defined in claim 5 wherein
   the predetermined pixel electrodes among said plurality of pixel electrodes only comprise pixel electrodes that are arranged adjacent to the connected pixel electrodes and associated with a different color.

8. The color liquid crystal display defined in claim 5 wherein
   said orientation controllers are provided in pixel regions corresponding to each of said plurality of pixel electrodes, and said data line overlaps said orientation controllers within predetermined pixel regions.

9. The color liquid crystal display defined in claim 5 wherein
   said orientation controllers comprise orientation control windows including electrode openings made in said common electrode at positions corresponding to said plurality of pixel electrodes.

10. The color liquid crystal display defined in claim 5 wherein
    said orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

11. The color liquid crystal display defined in claim 5 wherein
    said orientation controllers are provided within pixel regions corresponding to each of the plurality of pixel electrodes, and function as orientation dividers for providing a plurality of discrete orientations of liquid crystal within each pixel region; and
    said data line overlaps said orientation controllers within predetermined pixel regions.

12. The color liquid crystal display defined in claim 1 wherein
a transistor is connected to each of said plurality of pixel electrodes, and said data line is connected via said transistors to the pixel electrodes, among said plurality of pixel electrodes, that are associated with the same color and located closely along the column direction.

13. A color liquid crystal display comprising:
a plurality of pixel electrodes disposed in a matrix and arranged in a delta arrangement such that, in adjacent rows, positions of pixels associated with the same color are shifted from one another; and
a data line extending in a column direction while overlapping predetermined pixel electrodes among said plurality of pixel electrodes, said data line electrically connecting only to pixel electrodes associated with the same color and located closely along the column direction, at least one of said plurality of pixel electrodes overlapping said data line being electrically unconnected to said data line and being associated with a color different from the connected pixel electrodes.

14. The color liquid crystal display defined in claim 13 wherein
a row in which said data line overlaps a connected pixel electrode and a row in which said data line overlaps a pixel electrode associated with a color different from a connected pixel electrode are alternately arranged.

15. The color liquid crystal display defined in claim 13 wherein
the predetermined pixel electrodes among said plurality of pixel electrodes only comprise pixel electrodes that are arranged adjacent to the connected pixel electrodes and associated with a different color.

16. The color liquid crystal display defined in claim 13 further comprising:
a common electrode arranged opposing said plurality of pixel electrodes;
liquid crystal having a negative anisotropy of dielectric constant sealed between said common electrode and said plurality of pixel electrodes; and
orientation controllers for controlling orientation of said liquid crystal in pixel regions corresponding to each of said plurality of pixel electrodes; wherein
said data line overlaps said orientation controllers within predetermined pixel regions.

17. The color liquid crystal display defined in claim 16 wherein
a row in which said data line overlaps a connected pixels electrode and a row in which said data line overlaps a pixel electrode associated with a color different from a connected pixel electrode are alternately arranged.

18. The color liquid crystal display defined in claim 16 wherein
the predetermined pixel electrodes among said plurality of pixel electrodes only comprise pixel electrodes that are arranged adjacent to the connected pixel electrodes and associated with a different color.

19. The color liquid crystal display defined in claim 16 wherein
said orientation controllers comprise orientation control windows including electrode openings made in said common electrode at positions corresponding to said plurality of pixel electrodes.

20. The color liquid crystal display defined in claim 16 wherein
said orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

21. The color liquid crystal display defined in claim 13 wherein
a transistor is connected to each of said plurality of pixel electrodes, and said data line is connected via said transistors to the pixel electrodes, among said plurality of pixel electrodes, that are associated with the same color and located closely along the column direction.

22. A color liquid crystal display comprising:
a plurality of pixel electrodes arranged in a matrix such that, in adjacent rows, positions of pixels associated with the same color are shifted from one another in a row direction; and
a data line extending in a column direction while overlapping predetermined pixel electrodes among said plurality of pixel electrodes through an inner side of a formation region of said predetermined pixel electrodes, said data line electrically connecting only to pixel electrodes associated with the same color and located closely along the column direction, at least one of said plurality of pixel electrodes overlapping said data line by said data line extending through the inner side of the formation region being electrically unconnected to said data line and being associated with a color different from the connected pixel electrode.

23. The color liquid crystal display according to claim 22 wherein a row in which said data line overlaps a connected pixel electrode and a row in which said data line overlaps a pixel electrode associated with a color different from a connected pixel electrode are alternately arranged.

24. The color liquid crystal display according to claim 22 wherein the predetermined pixel electrodes among said plurality of pixel electrodes comprise pixel electrodes that are located adjacent to the connected pixel electrodes and associated with a different color.

25. The color liquid crystal display according to claim 22 wherein the predetermined pixel electrodes among said plurality of pixel electrodes only comprise pixel electrodes that are arranged adjacent to the connected pixel electrodes and associated with a different color.

26. The color liquid crystal display according to claim 22 wherein the orientation controllers comprise orientation control windows including electrode openings made in said common electrode at positions corresponding to said plurality of pixel electrodes.

27. The color liquid crystal display according to claim 22 wherein the orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

28. The color liquid crystal display according to claim 22 wherein a transistor is connected to each of said plurality of pixel electrodes, and said data line is connected via said transistors to the pixel electrodes, among said plurality of pixel electrodes, that are associated with the same color and located closely along the column direction.

29. A color liquid crystal display comprising:
- a plurality of pixel electrodes disposed in a max and arranged in a delta arrangement such that, in adjacent rows, positions of pixels associated with the same color are shifted from one another; and
- a data line extending in a column direction while overlapping predetermined pixel electrodes among said plurality of pixel electrodes through an inner side of a formation region of said predetermined pixel electrodes, said data line electrically connecting only to pixel electrodes associated with the same color and located closely along the column direction, at least one of said plurality of pixel electrodes overlapping said data line by said data line extending through the inner side of the formation region being electrically unconnected to said data line and being associated with a color different from the connected pixel electrodes.

30. The color liquid crystal display according to claim 29 wherein a row in which said data line overlaps a connected pixel electrode and a row in which said data line overlaps a pixel electrode associated with a color different from a connected pixel electrode are alternatively arranged.

31. The color liquid crystal display according to claim 29 wherein the predetermined pixel electrodes among said plurality of pixel electrodes only comprise pixel electrodes that are arranged adjacent to the connected pixel electrodes and associated with a different color.

32. The color liquid crystal display according to claim 29 wherein the orientation controllers comprise orientation control windows including electrode openings made in said common electrode at positions corresponding to said plurality of pixel electrodes.

33. The color liquid crystal display according to claim 29 wherein the orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

34. The color liquid crystal display according to claim 29 wherein a transistor is connected to each of said plurality of pixel electrodes, and said data line is connected via said transistors to the pixel electrodes, among said plurality of pixel electrodes, that are associated with the same color and located closely along the column direction.

35. A color liquid crystal display comprising:
- a plurality of pixel electrodes arranged in a matrix such that, in adjacent rows, positions of pixels associated with the same color are shifted from one another in a row direction;
- a common electrode arranged opposing said plurality of pixel electrodes;
- a liquid crystal having a negative anisotropy of dielectric constant sealed between said common electrode and said plurality of pixel electrodes;
- orientation controllers for controlling the orientation of said liquid crystal; and
- a data line extending in a column direction while overlapping predetermined pixel electrodes among said plurality of pixel electrodes, said data line electrically connecting only to pixel electrodes associated with the same color and located closely along the column direction, at least one of said plurality of pixel electrodes overlapping said data line being electrically unconnected to said data line and being associated with a color different from the connected pixel electrode;
- wherein said orientation controllers are provided in pixel regions corresponding to each of said plurality of pixel electrodes, and said data line overlaps said orientation controllers within predetermined pixel regions.

36. The color liquid crystal display according to claim 35 wherein a row in which said data line overlaps a connected pixel electrode and a row in which said data line overlaps a pixel electrode associated with a color different from a connected pixel electrode are alternately arranged.

37. The color liquid crystal display according to claim 35 wherein the predetermined pixel electrodes among said plurality of pixel electrodes comprise pixel electrodes that are located adjacent to the connected pixel electrodes and associated with a different color.

38. The color liquid crystal display according to claim 35 wherein the predetermined pixel electrodes among said plurality of pixel electrodes only comprise pixel electrodes that are arranged adjacent to the connected pixel electrodes and associated with a different color.

39. The color liquid crystal display according to claim 35 wherein the orientation controllers comprise orientation control windows including electrode openings made in said common electrode at positions corresponding to said plurality of pixel electrodes.

40. The color liquid crystal display according to claim 35 wherein the orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

41. The color liquid crystal display according to claim 35 wherein a transistor is connected to each of said plurality of pixel electrodes, and said data line is connected via said transistors to the pixel electrodes, among said plurality of pixel electrodes, that are associated with the same color and located closely along the column direction.

42. A color liquid crystal display comprising:
- a plurality of pixel electrodes disposed in a matrix and arranged in a delta arrangement such that, in adjacent rows, positions of pixels associated with the same color are shifted from one another;
- a common electrode arranged opposing said plurality of pixel electrodes;
- a liquid crystal having a negative anisotropy of dielectric constant sealed between said common electrode and said plurality of pixel electrodes;
- orientation controllers for controlling orientation of said liquid crystal in pixel regions corresponding to each of said plurality of pixel electrodes; and
- a data line extending in a column direction while overlapping predetermined pixel electrodes among said plurality of pixel electrodes, said data line electrically connecting only to pixel electrodes associated with the same color and located closely along the column direction, at least one of said plurality of pixel electrodes overlapping said data line being electrically unconnected to said data line and being associated with a color different from the connected pixel electrodes;
- wherein said data line overlaps said orientation controllers within predetermined pixel regions.

43. The color liquid crystal display according to claim 42 wherein a row in which said data line overlaps a connected pixel electrode and a row in which said data line overlaps a pixel electrode associated with a color different from a connected pixel electrode are alternatively arranged.

44. The color liquid crystal display according to claim 42 wherein the predetermined pixel electrodes among said plurality of pixel electrodes only comprise pixel electrodes that are arranged adjacent to the connected pixel electrodes and associated with a different color.

45. The color liquid crystal display according to claim 42 wherein the orientation controllers comprise orientation control windows including electrode openings made in said common electrode at positions corresponding to said plurality of pixel electrodes.

46. The color liquid crystal display according to claim 42 wherein the orientation controllers comprise orientation control slopes disposed on one or both of an interface between said common electrode and said liquid crystal and interfaces between said plurality of electrodes and said liquid crystal, said orientation control slopes being formed by causing said interfaces to protrude towards said liquid crystal.

47. The color liquid crystal display according to claim 42 wherein a transistor is connected to each of said plurality of pixel electrodes, and said data line is connected via said transistors to the pixel electrodes, among said plurality of pixel electrodes, that are associated with the same color and located closely along the column direction.

48. A color liquid crystal display comprising:

a plurality of pixel electrodes arranged in a matrix such that, in adjacent rows, positions of pixels associated with the same color are shifted from one another in a row direction; and a data line extending in a column direction while overlapping predetermined pixel electrodes among said plurality of pixel electrodes substantially through the center of said predetermined pixel electrodes, said data line electrically connecting only to pixel electrodes associated with the same color and located closely along the column direction, at least one of said plurality of pixel electrodes overlapping said data line by said data line extending substantially through the center being electrically unconnected to said data line and being associated with a color different from the connected pixel electrode.

* * * * *